United States Patent [19]

Foster

[11] Patent Number: 4,492,303

[45] Date of Patent: Jan. 8, 1985

[54] DRIVE/GUIDE SYSTEM FOR A RECIPROCATING FLOOR CONVEYOR

[76] Inventor: Raymond K. Foster, P.O. Box 1, Madras, Oreg. 97741

[21] Appl. No.: 346,865

[22] Filed: Feb. 8, 1982

[51] Int. Cl.³ .............................................. B65G 25/04
[52] U.S. Cl. ................................. 198/750; 414/525 B
[58] Field of Search .................... 198/750; 414/525 B; 308/3 C, 3 R

[56] References Cited

U.S. PATENT DOCUMENTS

| | | | |
|---|---|---|---|
| 2,629,504 | 2/1953 | Peterson | 214/83.3 |
| 2,973,856 | 3/1961 | Brooks | 198/219 |
| 3,534,875 | 10/1970 | Hallstrom, Jr. | 214/83.3 |
| 3,586,273 | 6/1971 | Sloyan | 308/3 X |
| 3,961,689 | 6/1976 | Leskovec | 308/3 C X |
| 4,143,760 | 3/1979 | Hallstrom | 198/750 |
| 4,144,963 | 3/1979 | Hallstrom | 198/750 |
| 4,148,531 | 4/1979 | Hornagold | 308/3 R |
| 4,184,587 | 1/1980 | Hallstrom | 198/750 |
| 4,378,890 | 4/1983 | Empson | 308/3 R X |
| 4,385,704 | 5/1983 | Spain et al. | 308/3 R X |

*Primary Examiner*—Robert B. Reeves
*Assistant Examiner*—Russell D. Stormer

[57] ABSTRACT

Reciprocating floor conveyor floor members (28) are moved by hydraulic cylinders (1, 2, 3) which are slightly tilted so as to exert a vertical component of force onto the ends of longitudinal drive beams (128, 130, 132) to which the cylinders (1, 2, 3) are connected. These beams (128, 130, 132) are made from tubular stock. Each is guided by a pair of longitudinally spaced apart bearings. Each bearing is a part of a bearing assembly (128, 130) which depends from an upper central portion of a transverse truss (80, 82). Each longitudinal drive member (128, 130, 132) is welded to a transverse drive beam (10, 12, 14) by fillet welds on each side of the longitudinal drive tube (128, 130, 132). Each such drive tube (128, 130, 132) is stiffened in the region of the weld by a short tubular insert which is rammed into the drive tube. The floor members (28) of the conveyor run on plastic slide bearings (26) which are snap fitted onto longitudinal guide beams (22). The guide beams (22) are small in size and are welded on both sides to transverse support beams (24). The construction of the slide bearings (26) permits the use of large dimension, strong, undressed fillet welds. The slide bearings (26) include wing portions (68) on each side which abut similar wing portions (68) on sideways adjacent bearings (26). The floor members (28) are held vertically relative to the bearings (26) by the engagement of bottom flanges (36, 38) within side slots (72) formed in the bearings (26). The floor members (28) add strength and stiffness to the bearings (26) and the abutting contact of the wing portions (68) causes the bearings (26) to mutually brace each other.

12 Claims, 20 Drawing Figures

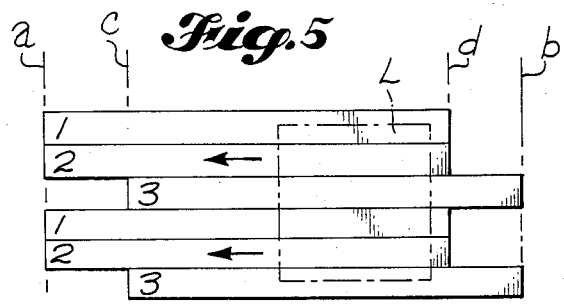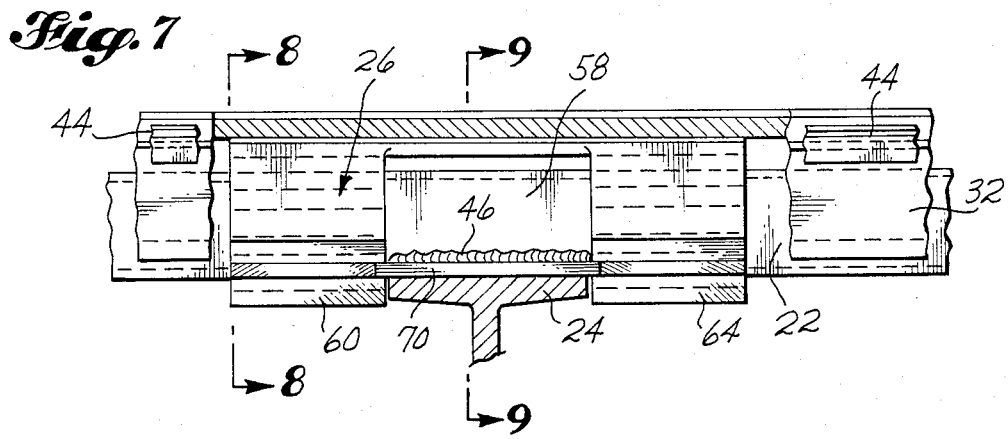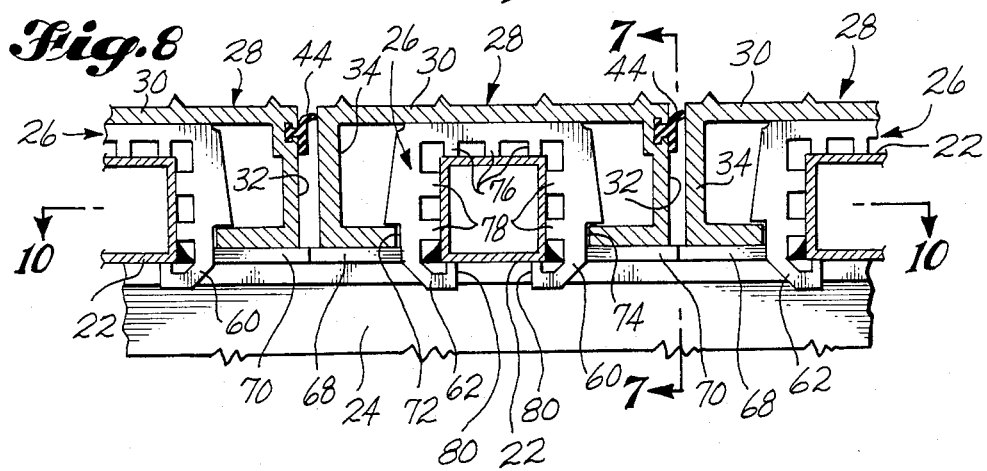

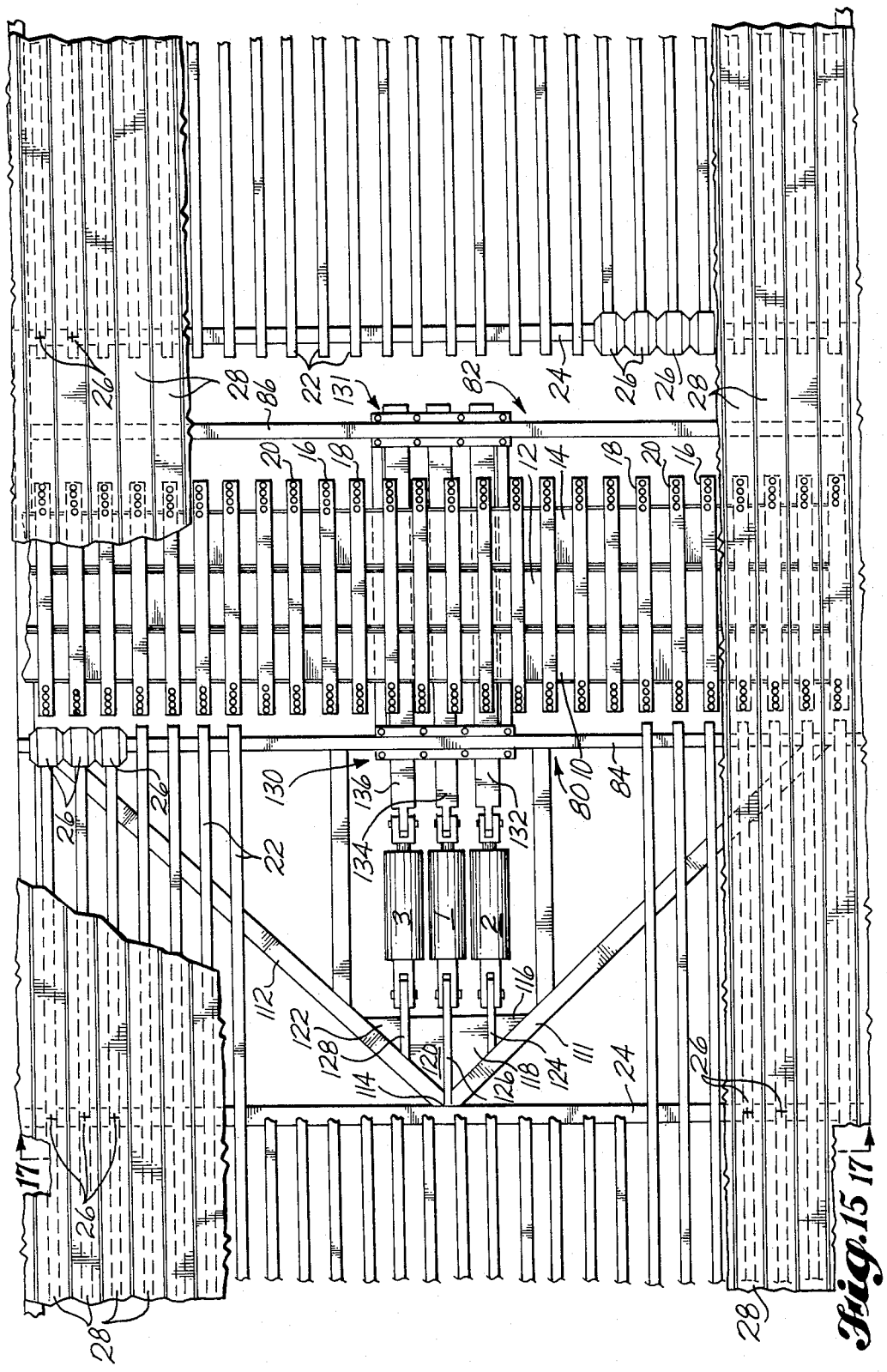

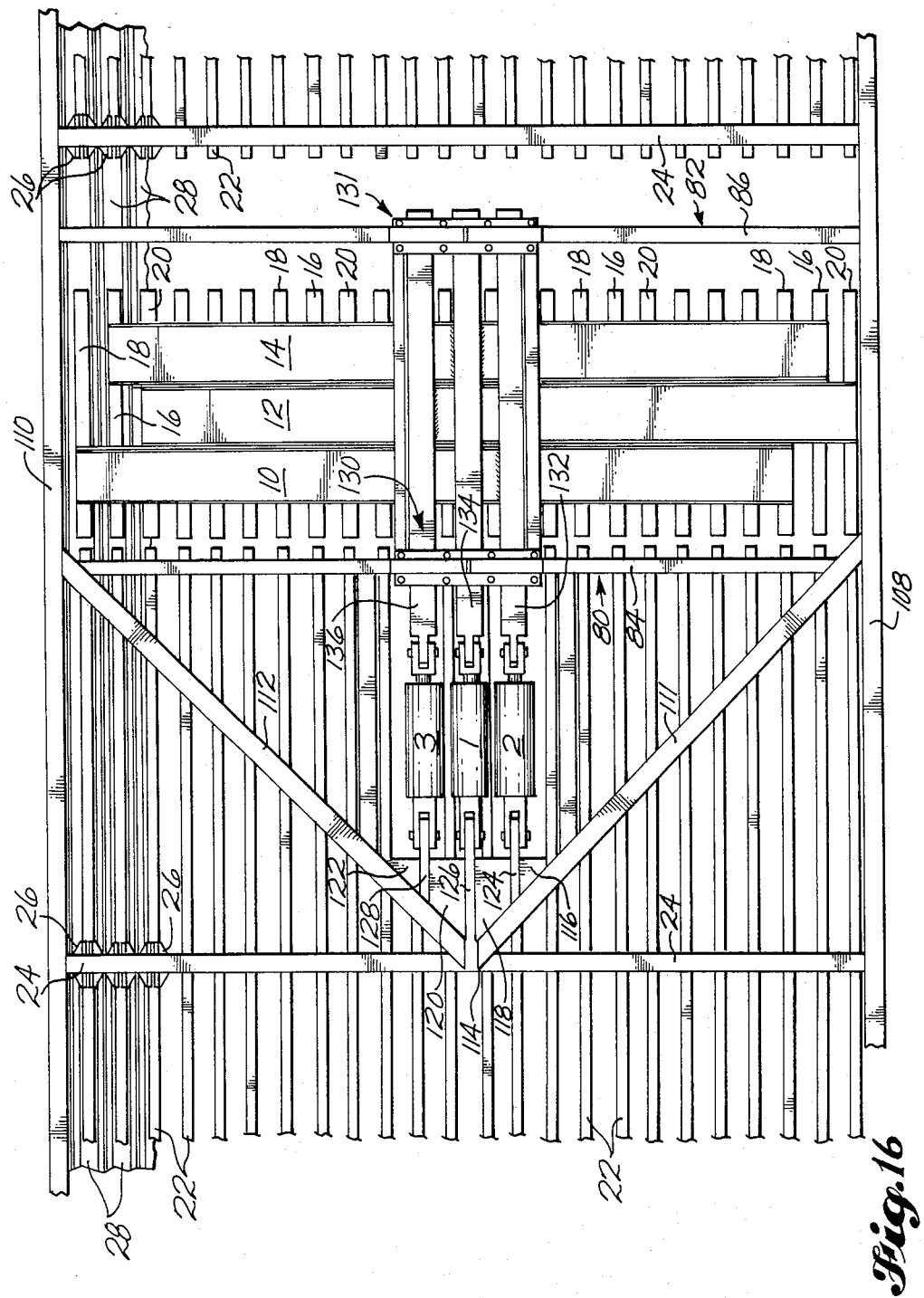

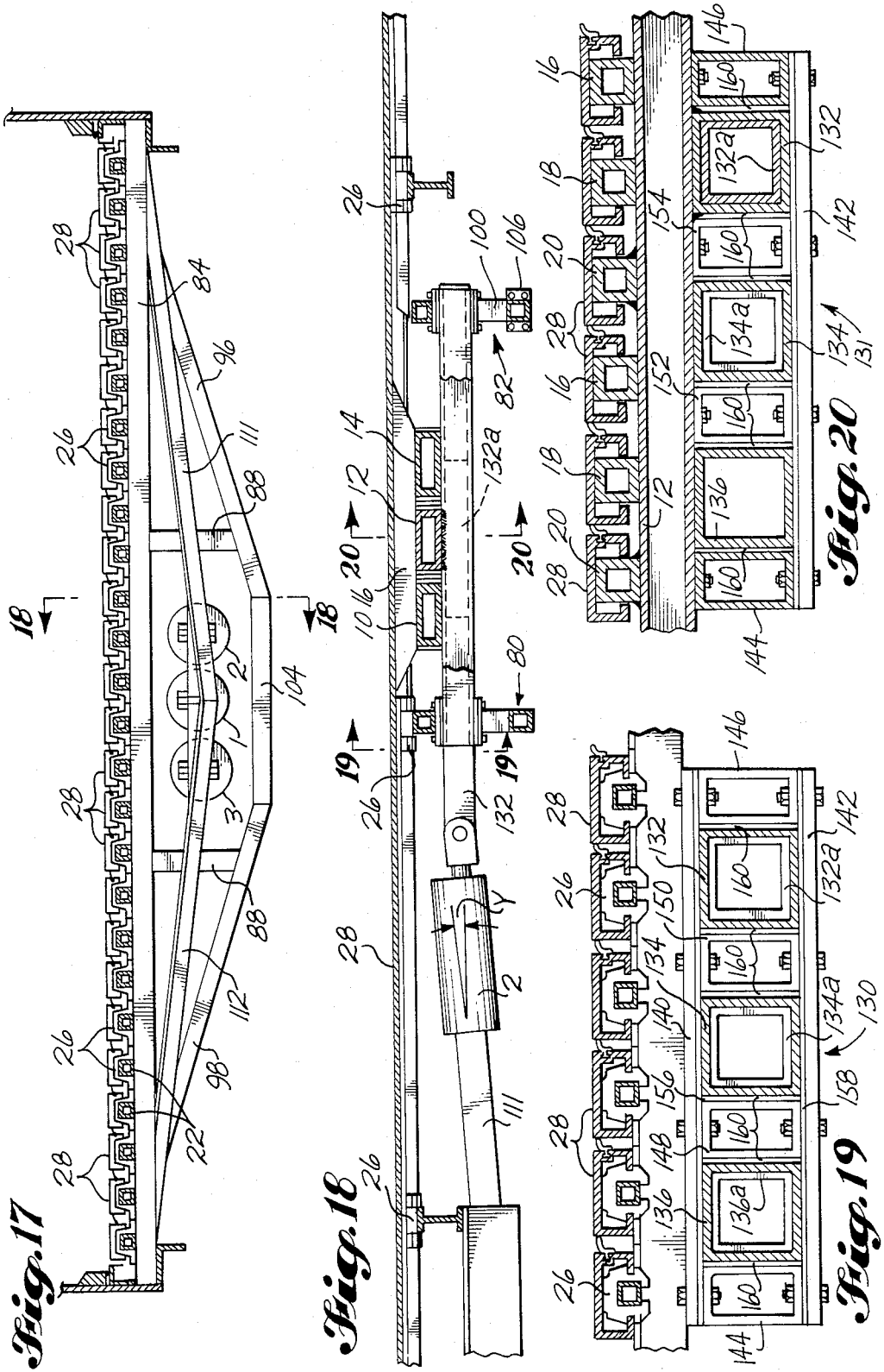

DRIVE/GUIDE SYSTEM FOR A RECIPROCATING FLOOR CONVEYOR

TECHNICAL FIELD

This invention relates to improvements in reciprocating floor conveyors, and in particular to an improved system for driving and guiding the floor members of such a conveyor.

BACKGROUND ART

The present invention improves the type of conveyor disclosed by U.S. Pat. No. 4,143,760, granted Mar. 13, 1979, and U.S. Pat. No. 4,184,587, granted Jan. 22, 1980, both to Olaf A. Hallstrom.

Basically, the reciprocating floor conveyor to which this invention relates includes at least one group of at least three elongated floor members and a hydraulic drive system which operates to drive the floor members in unison in the desired conveying direction and then to individually retract the floor members sequentially. During each retraction, there are more floor members stationary than moving, so the load does not move backwards.

The floor members are individually supported and guided by means which include elongated metal guide beams and a plurality of plastic slide bearings which are spaced apart along the guide beams. Specifically, the guide beams are welded to transverse support frame beams and a plastic slide bearing is provided at each point of connection of a guide beam to a transverse support beam.

Problems have been encountered because the hydraulic components of the hydraulic drive system are offset vertically below the guide beams and bearings. As a result, forces are created in the drive/guide system, particularly when some sort of resistance to free sliding movement of all floor members is encountered, which tend to break the slide bearings and/or guide beams loose. The principal object of the present invention is to provide a solution to problems of this type which have been experienced by equipment of the configurations disclosed by the above-identified patents.

Earlier forms of reciprocating floor conveyors are disclosed by U.S. Pat. No. 2,629,504, granted in February of 1953 to Peterson; by U.S. Pat. No. 2,973,856, granted in March of 1961 to Brooks; by U.S. Pat. No. 3,534,875, granted in October of 1970 to Hallstrom; and by West German Patent Pubication No. 1,296,087, published in May of 1969. These patents are not particularly pertinent to the subject invention and require no further comment.

DISCLOSURE OF THE INVENTION

The present invention provides an improved drive/guide system in which the problems of the guide beams and/or slide bearings being broken loose from their connections are substantially eliminated, including in relatively large stationary installations, e.g. in bunkers.

In accordance with one aspect of the invention, the guide tubes for the floor members are constructed from small dimension metal tubular stock (e.g. 1"×1" thin wall steel tubing) and such tubing is welded on each of its sides to the upper surface of each transverse support beam which it crosses. A plastic slide bearing is used which comprises a continuous top which extends above the guide beam for the full length of the bearing, and has opposite sidewall portions only at each end of the bearing. The sidewall portions extend downwardly from the top of the bearing outwardly adjacent the sides of the guide beam. Bottom lock flanges project laterally inwardly from the sidewall portions, into positions below the guide beam. A longitudinal wing is provided on each side of the bearing. Each wing extends laterally outwardly from its side of the bearing. Each wing also extends longitudinally of the bearing and interconnects the sidewall portions of the bearing on its side of the bearing. Each wing has an inner side edge which is spaced outwardly from the adjacent side of its guide beam a distance sufficient to provide clearance for a fillet weld of substantial size (e.g. three eighths of an inch). Owing to this arrangement, a workman can apply a fillet weld that is a quarter of an inch wide or wider, between each side of the guide beam and the transverse support beam on which it is supported. The fillet weld does not have to be ground down or otherwise dressed, as substantial space exists for accommodating as large a fillet as one would ever want to use, and the workmanship can even be sloppy. In other words, the fillet does not have to be the product of superior precision workmanship from a size and form standpoint. It need only be strong enough to carry the loads imposed on it.

In accordance with another important aspect of the invention, the side wings on the slide bearings extend outwardly to and abut the side wings of the bearings on each side of it. The contact that is established between the outer edges of the wings results in the bearings acting to mutually brace one another against inadvertent spreading apart of the sidewall portions of the bearings, attended by unwanted movement of the bearings up and off of the guide beams.

The side wings of the plastic slide bearings also provide a layer of bearing material between bottom flange portions of the floor members and the upper metal surfaces of the transverse support beams.

According to another aspect of the invention, guide beam and/or slide bearing breakage is combated by using stiffer longitudinal drive members than have been used in the past, for interconnecting the moving elements (e.g. piston rods) of the drive units (e.g. hydraulic cylinders) and the transverse drive beams to which the floor members are secured. Also, the longitudinal drive members are themselves stiffened where they are welded to the transverse drive beams by the simple insertion and frictional fit of a short stiffening member inside of each longitudinal drive member adjacent where it is welded to the transverse drive beam. The use of the stiffener acts to direct whatever amount of flexing which still occurs to the regions of the longitudinal drive member which are remote from the weld connection. This lessens breakage of the beams in the vicinity of the welds.

According to another aspect of the invention, the longitudinal drive beams are guided by an improved bearing system which includes longitudinal tie beams for directly interconnecting a pair of longitudinally spaced apart bearing assemblies.

In accordance with yet another aspect of the invention, bending forces on the several components which would tend to break the guide beams and/or the plastic slide bearings loose, are minimized by a simple change in the direction of applied force of the drive unit onto the longitudinal drive beam.

Other more detailed features of the invention are described in the description of the preferred embodi-

BRIEF DESCRIPTION OF THE DRAWINGS

In the drawings, like element designations refer to like parts throughout, and

FIG. 5 is a view like FIGS. 2-4, but showing floor members 1 and 3 stationary while floor members 2 are being retracted;

FIG. 6 is a view like FIGS. 2-5, but showing floor members 1 and 2 stationary and floor members 3 being retracted;

FIG. 7 is an enlarged scale fragmentary view of the region where a floor member guide beam crosses and is attached to a transverse floor support frame member, with a foreground portion of the floor member cut away for the purpose of showing a slide bearing provided at such location in side elevation, and showing a fragmentary portion of the transverse floor support frame member in section;

FIG. 8 is a cross-sectional view taken substantially along line 8—8 of FIG. 7;

FIG. 15 is a fragmentary top plan view showing the modular drive unit installed, with the central foreground portion of the floor members cut away, and with portions of the guide beams cut away, for the purpose of better illustrating other components;

FIG. 16 is a bottom plan view of the installation shown by FIG. 15;

FIG. 17 is a sectional view taken substantially along line 17—17 of FIG. 15;

FIG. 18 is a longitudinal sectional view taken substantially along line 18—18 of FIG. 17;

FIG. 19 is a cross-sectional view taken substantially along line 19—19 of FIG. 18; and FIG. 20 is a cross-sectional view taken substantially along line 20—20 of FIG. 18.

BEST MODE FOR CARRYING OUT THE INVENTION

Figure 1:
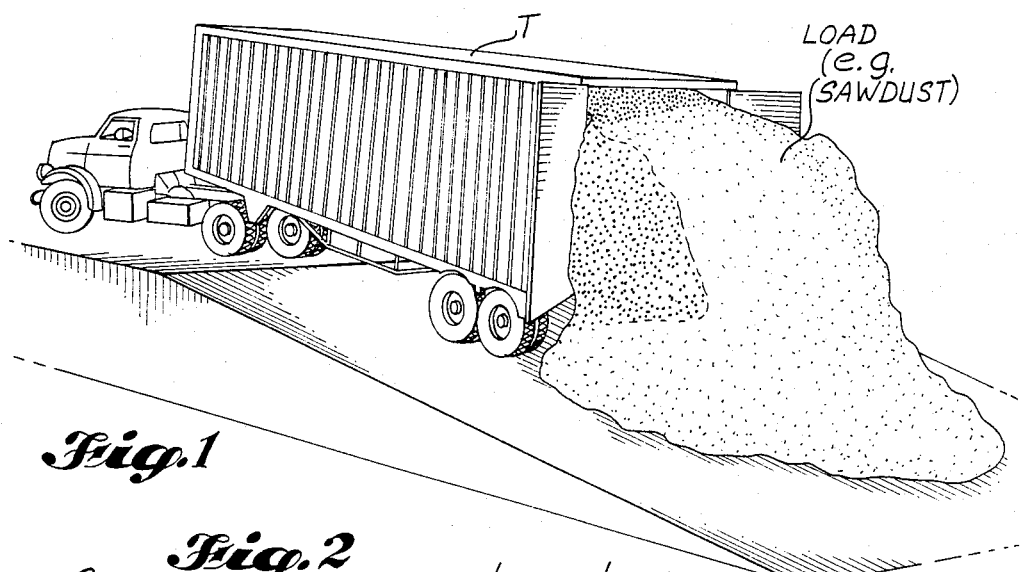
FIG. 1 is a pictorial view of a truck that is equipped with a reciprocating floor conveyor constructed in accordance with the present invention, shown in the process of using the conveyor to discharge its load.

FIG. 1 shows a load of sawdust or other bulk material being unloaded from a large truck T by use of a reciprocating floor conveyor within the truck T.

FIGS. 1-6 illustrate how the reciprocating floor conveyor works. These figures show two groups of floor members. Each group comprises three independent floor members designated 1, 2 and 3. The members "1" move together. The members "2" move together. And, the members "3" move together.

Figure 2:
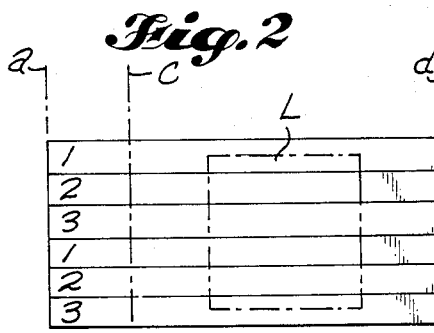
FIG. 2 is a top plan diagram of a conveyor which includes three floor members per group with each common floor member being identified by a common number, such conveyor being shown in a fully retracted position.
Figure 3:
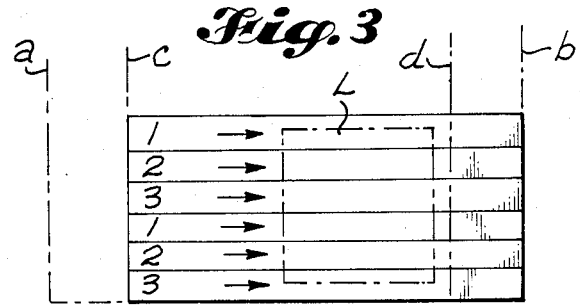
FIG. 3 is a view like FIG. 2, but showing all of the floor members being advanced in unison to convey a load in the direction indicated by arrows.
Figure 4:
FIG. 4 is a view like FIGS. 2 and 3, showing floor members 2 and 3 stationary while floor members 1 are being retracted.

FIG. 2 shows all of the floor members in a retracted position in which common ends are aligned at a start station a. A load L is shown centrally positioned on the floor. FIG. 3 shows all of the floor members being advanced together to move the load L forwardly and the opposite ends of the floor members to a fully advanced position b. FIG. 4 shows the group "1" floor members being retracted and the groups "2" and "3" floor members held stationary. The load does not move because the frictional forces exerted on it by the stationary floor members are larger than the frictional forces exerted on it by the retracting floor members "1". FIG. 5 shows the next step in the sequence. The retracted floor members "1" and the still advanced floor members "3" are held stationary and the floor members "2" are retracted. Again, the load L does not move. FIG. 6 shows retracted floor members "1" and "2" stationary and floor members "3" being retracted. Again, the load L does not move. In this example, the load L has moved a distance equal to the endwise movement of the floor, viz. a-c or d-b.

Referring now to FIGS. 7-20, the drive unit which has been illustrated is of a modular form and is adapted to be installed within a space provided for it within a main support frame of a vehicle or stationary installation. As best shown by FIGS. 15 and 16, when the modular framework is installed, the transverse drive beams 10, 12, 14, and the connector beams 16, 18, 20 carried thereby are positioned to reciprocate within a space defined at its ends by the ends of two axially aligned groups of guide beams 22.

Figure 9:
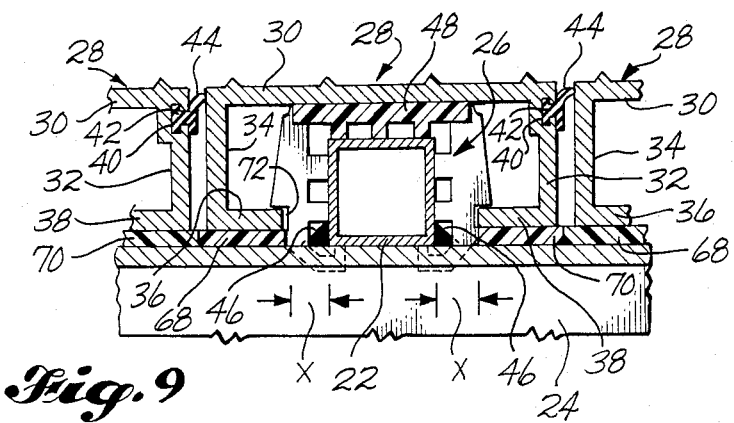
FIG. 9 is a cross-sectional view taken substantially along line 9—9 of FIG. 7.

As best shown by FIGS. 15 and 16, the main support frame of the installation comprises a plurality of transverse support beams 24. The guide beams 22 extend across upper surface portions of the transverse support beams 24. The guide beams 22 are connected to the support beams 24 by fillet welds on each side of the guide beams 22 (FIG. 9).

The connectors 16 are connected to and move with the transverse drive beam 14. The connectors 18 are connected to and move with the transverse drive beam 12. The connectors 20 are connected to and move with the transverse drive beam 10. The relative movement and the sequence of movement are quite well illustrated in FIGS. 11-14. As shown by FIGS. 9-16 and 18, the group "1" floor members are connected to the connectors 16 carried by transverse drive beam 14. The group "2" floor members are connected to the connectors 18 carried by the transverse drive beam 12. The floor members "3" are connected to the connectors 20 carried by the transverse drive beam 10. Preferably, the connectors 16, 18, 20 are welded to the transverse drive beams 10, 12, 14. The floor members "1", "2", "3" are secured to the connectors 16, 18, 20 by means of bolts or other suitable fasteners which extend through openings in the floor members and connectors.

Aside from their connection to the connectors 16, 18, 20, the floor members "1", "2" and "3" are free to move. The guide beams 22 are provided to guide their movement and plastic slide bearings 26 are provided to facilitate movement.

Throughout the several figures of the drawing, some of the floor members are designated 28. Some of the guide beams are designated 22. Some of the transverse support beams are designated 24. Some of the bearings are designated 26. Also, in FIG. 15, some of the locations of the plastic slide bearings are also designated 26. It is to be understood that a plastic slide bearing is to be provided at each location where a longitudinal guide beam 22 crosses and is connected to a transverse support beam 24.

Referring to FIG. 9, each floor member 28 comprises a top panel 30, a pair of side panels 32, 34 which depend from the top panel 30 and a pair of inwardly directed bottom flanges 36, 38. A T-shaped groove is formed in the upper portion of each side panel 32 to receive the T-shaped locking portion 42 of a seal strip 44. A lip portion of the seal strip 44 makes contact with an upper outer side portion of the side panel 34 of the adjoining floor member 28.

Figure 10:
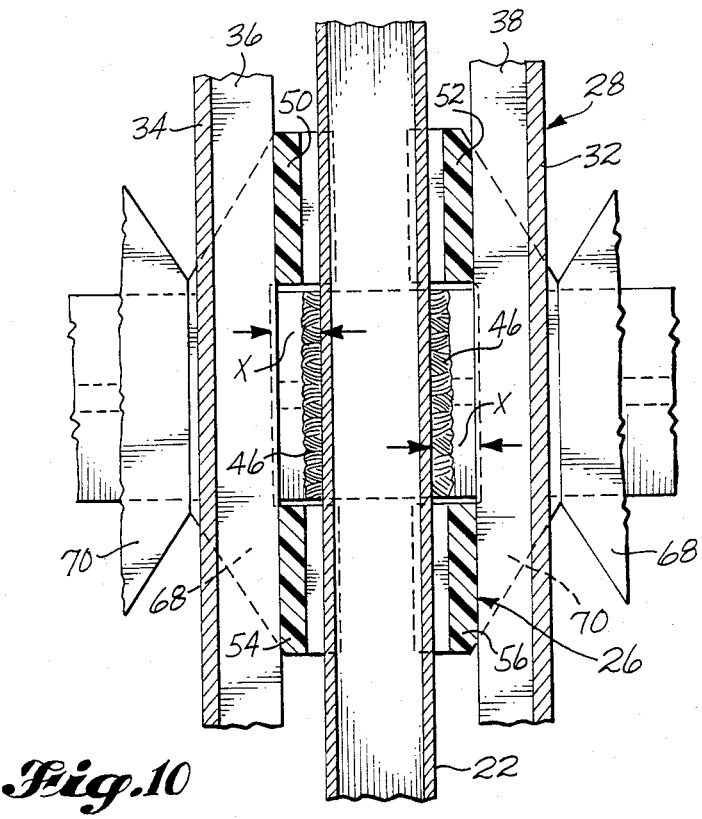
FIG. 10 is a sectional view taken substantially along line 10—10 of FIG. 8, showing components which are below the section line in top plan.

As best shown by FIGS. 9 and 10, the longitudinal guide beams 22 are relatively small in cross section in comparison with the cross section of the floor members 28. This creates no problem because forces are only carried at the location of the slide bearings 26. In a typical installation, thin wall steel tubing, of square cross section, having an outside dimension of about 1"×1" is preferred. Such tubing is used in combination with floor members which measure approximately 3½" in width. An important factor in the installation is that the dimensions "x" are substantially large, e.g. about ⅜ of an inch. This provides sufficient room on each side of the guide beams 22 for a very substantial, undressed fillet weld 46. This is quite important because a larger weld can be applied faster and with less care than a smaller weld and the strength of the connection is greater. A problem encountered with the use of a large dimension guide tube, such as disclosed in the aforementioned U.S. Pat. No. 4,184,587, was that it greatly limited the room available at the sides of the guide tubes for welding them to the transverse support frame beams. Skillful welding was required and in many cases the weld had to be "dressed". The resulting fillet was relatively small regardless of the quality of the weld and the connections were often weakened by the grinding or other dressing that was necessary.

The use of the small dimension guide tubes 22 and the particular slide bearing configuration 26 that is disclosed herein is what has made it possible for me to use larger, stronger fillet welds between the guide beams 22 and the support beams 24.

As best shown by FIGS. 7–10, the plastic slide bearing 26 of the present invention comprises a continuous top 48 which extends the full length of the bearing 26. Sidewall portions 50, 52, 54, 56 are proveded only at the ends of the bearing 26. Sidewall portions 50, 54 are provided on one side of the bearing and are separated by a large dimension opening or window 58 (FIG. 7). A similar central opening or window is provided on the opposite side of the bearing, between sidewall portions 52, 56.

An inwardly directed lock flange 60, 62, 64 66 extends laterally inwardly from each sidewall portion 50, 52, 54, 56.

The presence of the side openings or windows 58 would severely weaken the sidewall portions 50, 52, 54, 56, rendering the bearing 26 structurally inadequate, if it were not for the provision of a longitudinal wing 68, 70 on each side of the bearing 26. Each wing 68, 70 projects laterally outwardly from its side of the bearing 26, and has a bottom surface which rests on the top surface of the support beam 24. Each wing 68, 70 extends longitudinally of the bearing 26 and interconnects the two sidewalls 50, 54 or 52, 56 on its side of the bearing 26. Owing to the direction of its extent (it extends perpendicular to the sidewalls) it inherently stiffens and strengthens both of the sidewall portions to which it is connected. Further, and quite importantly, each wing 68, 70 includes an outer edge portion which makes abutting contact with the outer edge portion of the wing 70, 68 for the next bearing over on its side of its bearing 26 (FIGS. 8–10). This abutting contact between the outer edges of the wings 68, 70 prevents the sidewall portions 50, 52, 54, 56 of the bearings 26 from spreading apart in response to any upwardly directed force on the floor member which might occur.

As clearly shown in FIGS. 8 and 9, each sidewall portion 50, 52, 54, 56 includes a projecting shoulder which together with the wings 68, 70 on its side of the bearing 26 defines a generally square-shaped slot 72, 74. The inner edge portions of the bottom flanges 36, 38 are received within the slots 72, 74, and this is what holds the floor members 28 onto the bearings 26.

The use of a relatively small dimension guide tube 24, also makes it possible to thicken the wall portions of the bearings 26. This is particularly important in the region of the lock flanges 60, 62, 64, 66.

As shown by FIGS. 8 and 9, the top panel 48 of each bearing 26 is formed to include a plurality of longitudinally extending internal strengthening ribs 76. The sidewall portions 50, 52, 54, 56 of the bearings 26 include longitudinally extending, internal strengthening ribs 78. The lock flanges 60, 62, 64, 66 are formed to first slope downwardly and inwardly generally from where the sidewall portions 50, 52, 54, 56 join the wings 68, 70. Then, the lock flanges 60, 62, 64, 66 extend laterally inwardly and at their inner extremities include upwardly projecting, longitudinally extending strengthening ribs 80 (FIG. 8).

In accordance with an aspect of the invention, the portions of the top wall 48 between the strengthening ribs 78 is made to be thinner than the regions of the sidewall portions 50, 52, 54, 56 between the strengthening ribs 78. This is done so that the top panel will bend more easily than the sidewalls.

The bearings are installed by setting them down onto the top of the guide beam 22 and then spreading the sides apart a sufficient amount to allow a space between the lock flanges 60, 62, 64, 66 sufficiently large to allow passage of the guide beam 22. The bearings 26 are merely pushed downwardly until the lock flanges 60, 62, 64, 66 clear the bottom surface portions of the guide beam 22, where they emerge on opposite sides of the support beam 24. When this happens, the sidewall portions 50, 52, 54, 56 of the bearings 26 act like springs and snap into place (FIG. 8).

As shown by FIG. 7, the inner ends of the lock flanges 60, 62, 64, 66 act to contain the bearing 26 in position relative to the transverse beam 24.

As shown by FIG. 8, the bottom surface of the top panel 30 of each floor member 28 may rest on the upper surface of the top 48 of the bearing. Or, the bottom surfaces of the floor member flanges 36, 38 may rest on the upper surfaces of the wings 68, 70. In some installations, a little of both will occur. The presence of the wings 68, 70, which are bearing surfaces, assures that at no time will there be metal-to-metal contact between the floor members 28 and the support frame members 24.

The location of the inner edge portions of the floor member flanges 36, 38 within the bearing slots 72, 74 functions to add the stiffness of the floor members 28 to the load system. That is, any force tending to lift a bearing 26, will encounter the stiffness of the floor member 28, bracing the wings, the sidewall portions and the lock flanges of the bearings 26 against movement. The fact that the lock flanges 60, 62, 64, 66 are made relatively thick in size, and the presence of the sloping wall portions of the lock flanges 60, 62, 64, 66 sufficiently strengthen such lock flanges against breakage. However, of most importance is the fact that the guide beams 22 are connected to the transverse beams 24 by quite large and strong welds. This fact assures against the breakage of the joint and the movement of the guide tubes 22 which would impose upward forces on the bearings. The use of the large weld connections is only made possible by the use of bearings 26 constructed in accordance with the present invention.

Referring to FIGS. 11–14, the modular frame is similar to the modular frame disclosed by the aforementioned U.S. Pat. No. 4,184,587, yet is different.

The modular frame comprises a pair of laterally extending trusses 80, 82 which are spaced apart in the direction of floor member reciprocation. Each truss 80, 82 includes a transverse upper frame member 84, 86. Vertical members 88, 90, 92, 94 depend from intermediate portions of the top members 84, 86. Diagonal members 96, 98, 100, 102 slope downwardly and inwardly from the outer end regions of members 84, 86. Central horizontal members 104, 106 extend between and interconnect the inner ends of the diagonal members 96, 98, 100, 102. The outer ends of the top members 84, 86 and the diagonal members 96, 98, 100, 102 are welded to a pair of elongated side members 108, 110. At one end of the modular frame, a pair of diagonal members 111, 112 extend generally horizontally from points of connection in the vicinity of the outer ends of truss 80 to a common apex 114. The apex 114 is strengthened by cut blocks of metal 116, 118, 120, 122 which are welded to portions of the members 111, 112, and to mounting straps 124, 126, 128. The mounting straps 124, 126, 128 project inwardly of the unit from the apex and provide points of pivotal connection for the mountings at ends of a set of substantially identical, reversible linear actuators, e.g. double acting hydraulic drive cylinders. These cylinders are identified by the numbers of the floor members which they drive.

Of course, the number of groups of floor members, and hence the number of drive cylinders or equivalent drive means (e.g. screw jacks) can vary. The control system is not a part of the present invention and so it has not been specifically illustrated or described. However, a control system like that shown in the aforementioned U.S. Pat. No. 4,143,760 is preferred and the description of the operation of the cylinders and the components to which they are connected will correspond to the operating sequences which are disclosed in U.S. Pat. No. 4,143,760.

In accordance with an aspect of the invention, each truss carries a bearing assembly 130, 131 providing bearings for longitudinal drive members 132, 134, 136. These drive members correspond generally to the drive members 46 disclosed in the aforementioned U.S. Pat. No. 4,184,587. However, my drive tubes are constructed from relatively large size tubular steel stock, e.g. 3"×3". Also, the bearing assemblies 130, 131 exist apart from the upper members 84, 86 of the trusses 80, 82. The upper truss members 84, 86 are not weakened in any way, such as providing openings through them.

Referring to FIGS. 19 and 20, each guide bearing assembly 130, 131 comprises upper and lower metal plates 140, 142. Each top plate 140 is welded to an upper cross member 84, 86 of its truss 80, 82. Plate 140, at its ends, is bolted to the upper wall of a length of tubular metal stock (e.g. steel tubing measuring about $1\frac{1}{2}"\times 3"$) which extends longitudinally of the frame to a location of similar connection to the top plate 140 of the opposite truss. Each lower plate 142 is at its ends bolted or otherwise secured to the related end of a side beam 144, 146. The two beams 144, 146 provide a significant contribution to the strength and rigidity of the modular frame unit, and further function to maintain the guide bearings in proper alignment with each other.

Each bearing assembly 130, 131 further includes a pair of spacers 148, 150 and 152, 154. Preferably, these spacers 148, 150, 152, 154 are short lengths of the same tubular stock that is used for the side beams 144, 146. These spacers 148, 150, 152, 154 may also be bolted to the top and bottom plates 140, 142, as shown in the drawing figures.

The openings which are vertically defined between the plates 140, 142, and horizontally between the members 144, 148, 150, 146 provide guideways for the drive tubes 132, 134, 136. These guideways are lined by sheet bearing material, e.g. synthetic thermoplastic resin such as Teflon (Trademark), Delrin (Trademark), polyethylene, etc., or some other suitable material having a low coefficient of friction. These same materials may be used for constructing the above-described slide bearings 26.

As best shown by FIG. 19, upper and lower sheets 156, 158 may be sandwiched in between the plates 140 and 142 and the upper and lower surfaces of the members 144, 148, 150, 146. Additional sheets 160 of this same material are provided on the sides of the guideways. These sheets 160 may be glued in place.

The use of tubing stock for the longitudinal drive beams or rods 132, 134, 136 by itself results in an improvement. These members are lightweight but at the same time are stronger and stiffer than the solid bar stock material used in the installation disclosed by the above-identified U.S. Pat. No. 4,184,587.

The particular bearing assemblies 130, 131 which have been described also contribute significantly to an improved trouble-free operation of the drive/guide system. The bearing assemblies 130, 131 are separate from the top members 84, 86 of the trusses 80, 82. However, their securement to such top members results in the structural frame portions of the bearing assemblies 130, 131 and the top frame members 84, 86 mutually bracing and strengthening each other.

The vertical components 88, 90, 92, 94 of the trusses 80, 82 are situated immediately outwardly adjacent the beams 144, 146. Thus, these members 88, 90, 92, 94, the beams 144, 146 and the central portions of the top members 84, 86, all contribute, in a lightweight and efficient manner, to provide the frame structure with strength and form.

Figure 11:
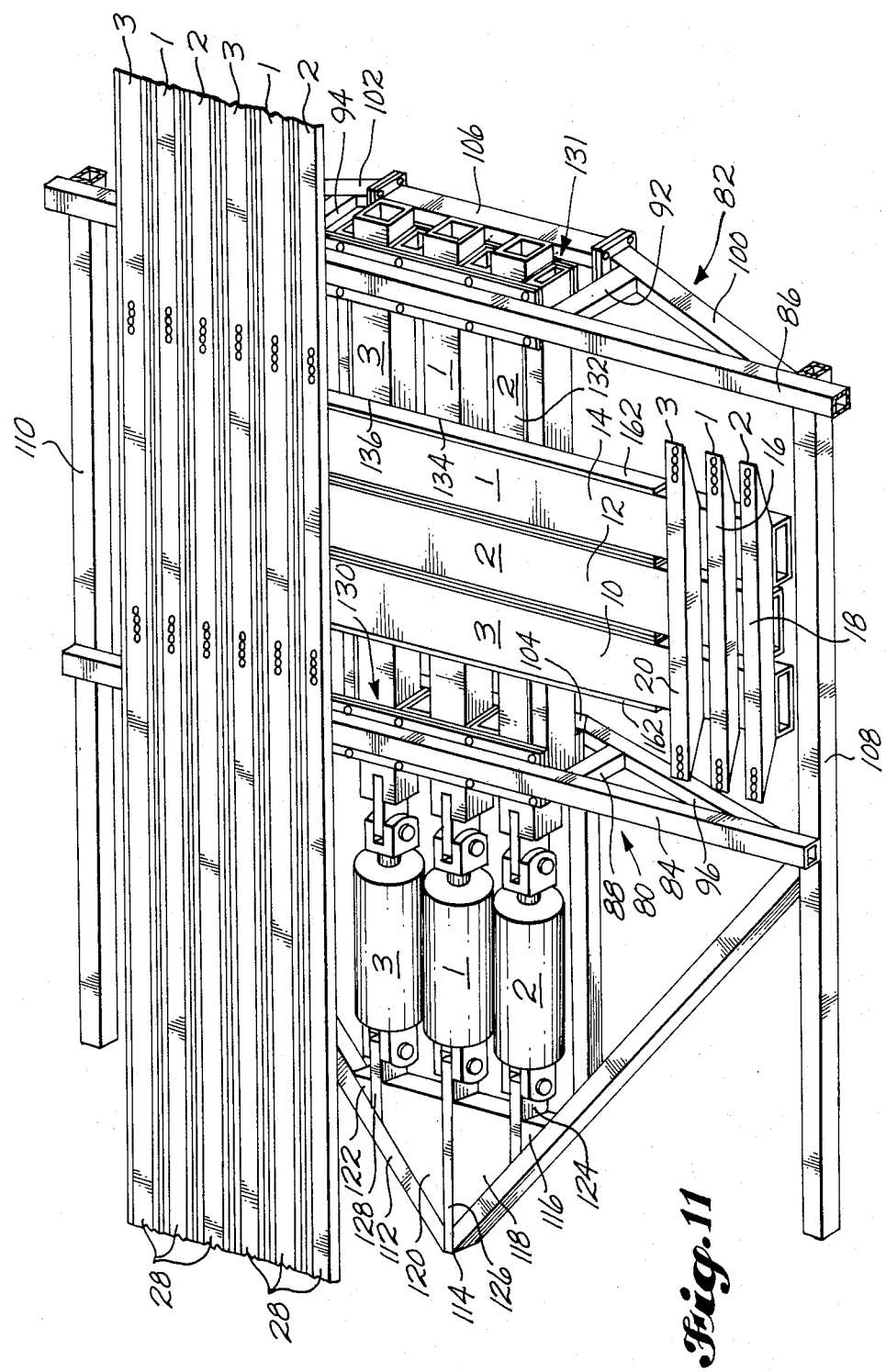
FIG. 11 is a pictorial view, taken from above towards one side and one end of a modular drive unit, with some parts omitted for the purpose of more clearly illustrating other parts, with the floor members 2 and 3, and the associated drive components, shown in a stationary or "load holding" position and showing the floor members 1 and the associated drive components being retracted.
Figure 12:
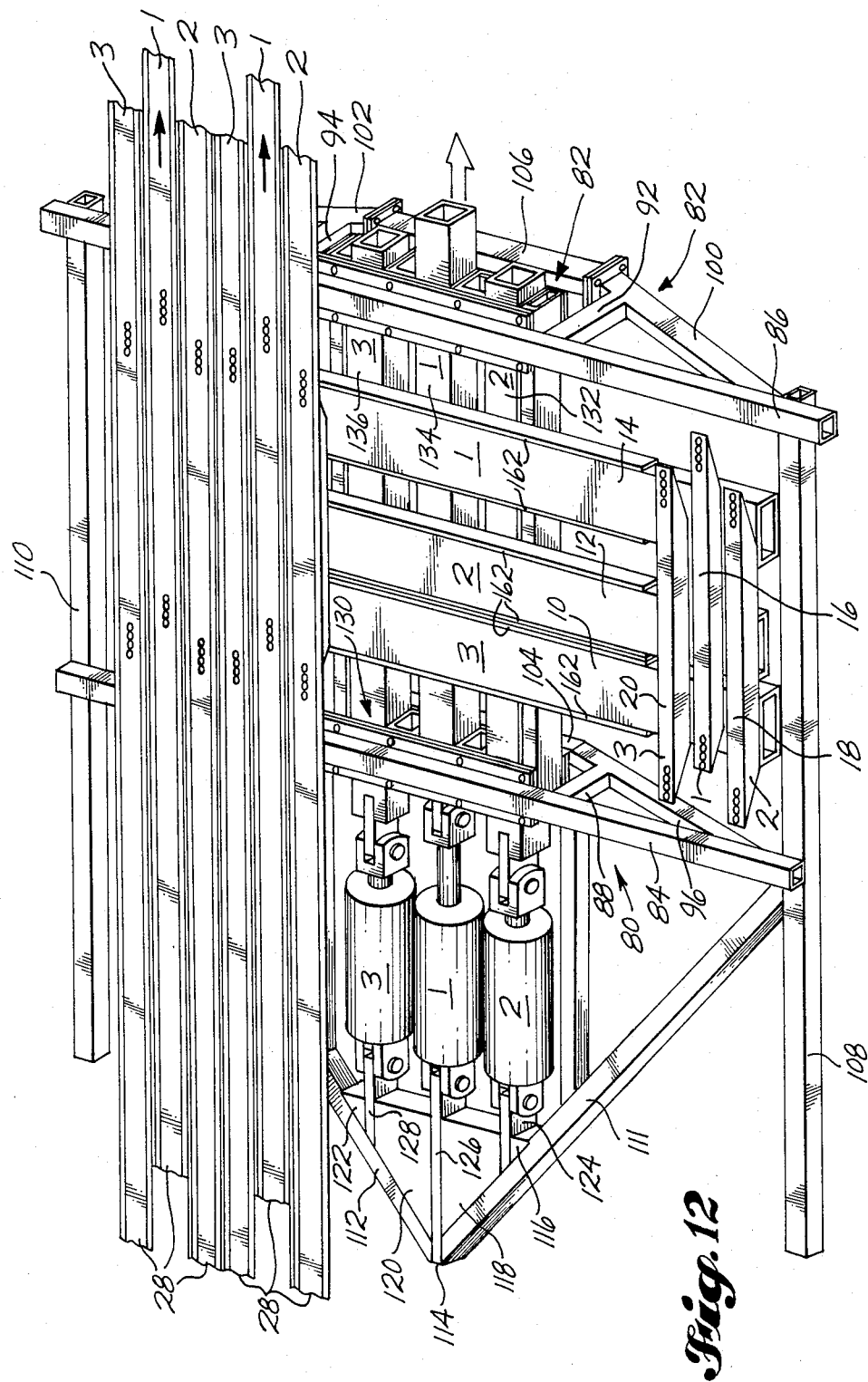
FIG. 12 is a view like FIG. 11, but showing the floor members and drive components 1 and 3 stationary and the floor members and drive components 2 being retracted.
Figure 13:
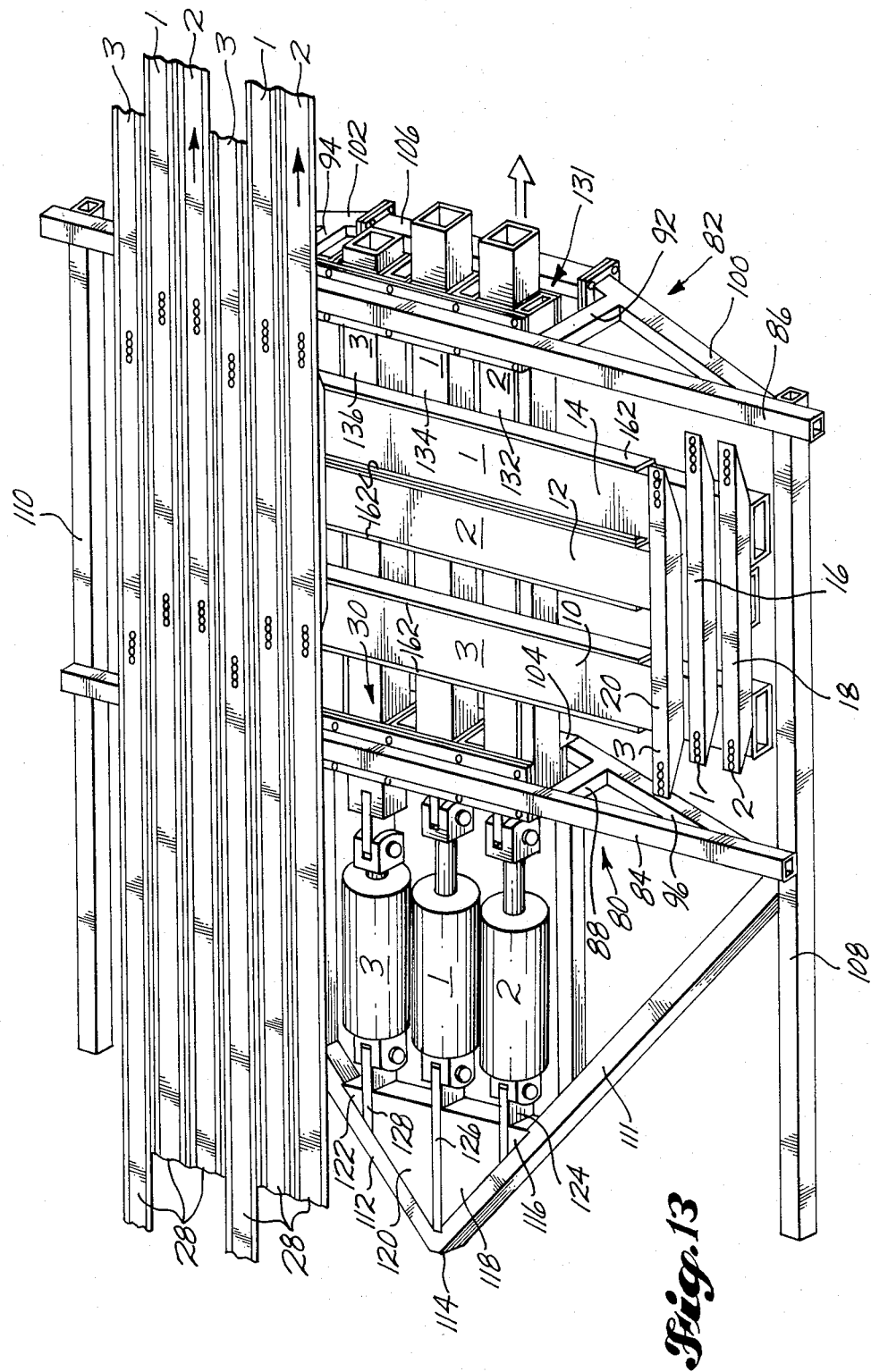
FIG. 13 is a view like FIGS. 11 and 12, but showing the floor members and drive components 1 and 2 stationary and the floor members and drive components 3 being retracted.
Figure 14:
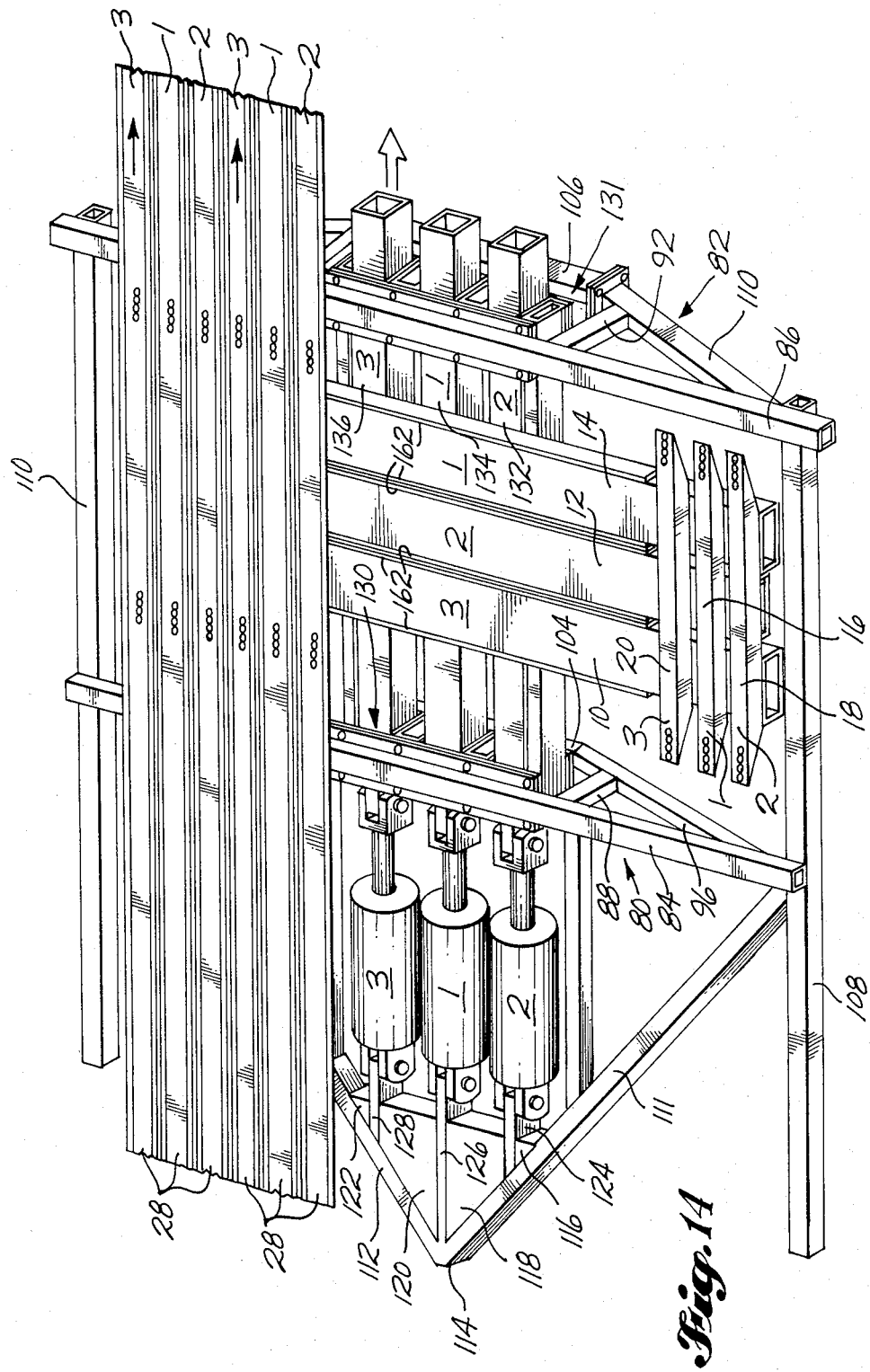
FIG. 14 is a view like FIGS. 11-13, but showing all floor members, and the associated drive components, in the process of advancing.

The transverse drive beams 10, 12, 14 are constructed from rectangular tubular stock material. They may be reinforced or strengthened at their edges by welding there two strips of plate material 162. These beams 10, 12, 14 are secured to the longitudinal drive beams 132, 134, 136, preferably by fillet weld connections (FIG. 11). Bending causes the material adjacent the welds to break or tear. In accordance with an aspect of the invention, each of the longitudinal drive beams 132, 134, 136 is stiffened only in that region where it is welded to its transverse cross beam 10, 12, 14. This is done in a very simple and efficient manner. Specifically, a short length of tubing 132a, 134a, 136a having an outside size closely equal to the inside size of the tubing used for the members 132, 134, 136 is rammed into the tubes 132, 134, 136, into juxtaposition with the welds (FIGS. 16 and 18). Some flexing of the members 132, 134, 136 is desired and such flexing can still occur in the unreinforced regions of the these members.

In accordance with another aspect of the invention, the axes of the cylinders are set at an angle so that the force lines through the axes of the cylinders rise in the direction of the connectors 16, 18, 20. The angle of rise is relatively small. The benefit of this arrangement is that it results in an upward component force being applied to the connection of the piston rods to the drive tubes 132, 134, 136, when the pistons are extended, and a downward component when the pistons are retracted. The fact that the cylinders are offset below the points of connections of the members 16, 18, 20 to the floor members results in a tendency of the ends of members 132, 134, 136 opposite the pistons to rise during extension of the pistons. It also has the effect of the piston ends of the members 132, 134, 136 wanting to rise during retraction of the cylinders. The angular setting of the cylinders provide upward and downward components at the piston ends of the members 132, 134, 136 which at least partially neutralize these tendencies of the members 132, 134, 136 to bend.

The use of (1) the small dimension guide tubes, (2) the large and strong weld connections between the guide tubes and the transverse support beams, (3) the improved slide bearings which make it possible to use the larger welds, which result in the bearings mutually bracing each other all the way across the floor, and which further result in the floor members acting to strengthen and brace the bearings, (4) the large dimension tubular, longitudinal drive members 132, 134, 136, (5) the bearing assemblies which strengthen rather than weaken the associated portions of the trusses, (6) stiffener tubes within such longitudinal drive tubes, and (7) the setting of the cylinders at a slight angle of rise in the direction of the tubes 132, 134, 136 all together provide an extremely effective and efficient drive and guide system which is not beset with the failures and other problems that, in the past, have been experienced when using the described prior art systems.

As shown in FIGS. 11-14, the lower frame member 106 is detachably connected to the rest of the truss 82. This is easily done by providing bolt plates at the ends of such member 106 which are bolted at their corners to matching bolt plates which are welded to the adjacent end portions of the diagonal members 100, 102. Removal of this section 106 provides room required during disassembly of the unit.

A pair of laterally spaced apart, longitudinally extending tie beams are interconnected between the diagonal beam members 111, 112 and the upper cross member 84 of truss 80. The rear ends of these tie beams connect to truss 80 closely adjacent the vertical truss members 88. These tie members, and the earlier described tie members 144, 146 brace the interior portion of the frame structure longitudinally and prevent the trusses 80, 82 from bending in the direction of floor member movement.

Referring to FIG. 18, a preferred slope of the cylinders 1, 2, 3 is one and one-quarter inches to twenty and one-quarter inches, the lateral dimension being the length of a typical cylinder.

I claim:

1. A reciprocating floor conveyor, comprising:

a plurality of elongated floor members, each of which is of channel form comprising a top panel, a pair of opposite side panels projecting downwardly from the top panel, and a pair of bottom flanges projecting inwardly from the side panels;

an elongated metal guide beam for each floor member;

a plurality of transverse metal support beams;

said guide beams resting on said metal support beams;

a plurality of plastic slide bearings on the guide beams at locations where the guide beams rest on the support beams;

drive means for moving the floor members in one direction along the guide beams and bearings, for advancing a load, and for retracting them in the opposite direction; and the improvement comprising:

each said plastic slide bearing having a top which extends the full length of the bearing above the guide beam on which the bearing is mounted, sidewall portions on each side of the bearing, extending downwardly from the top of the bearing, outwardly adjacent the sides of the guide beam, and bottom lock flanges projecting inwardly from said sidewall portions, below the guide beam;

a wing on each side of the bearing, each wing extending laterally outwardly from its side of the bearing, in coplanar parallelism with the other wing, and in spaced parallelism with the top of the bearing;

said wings having lower surfaces resting on upper surface portions of the support beams, between the guide beams, and upper surfaces situated below the bottom flanges of the floor members;

each said wing having an outer edge which makes mutually bracing contact with the outer edge of an adjacent wing on a laterally adjacent plastic slide bearing, for an adjoining floor member.

2. A reciprocating floor conveyor according to claim 1, wherein the side portions of the guide bearings include laterally outwardly projecting shoulder portions which together with the wings define longitudinal slots on the sides of the slide bearings sized to loosely receive inner edge portions of the bottom flanges of the floor members.

3. A reciprocating floor conveyor according to claim 2, wherein each slide bearing includes internal longitudinal ribs directed towards the guide beam, on each of the top, the side portions and the bottom lock flanges of the bearing, for strengthening the top, the side portions and the bottom lock flanges of the bearing.

4. A reciprocating floor conveyor according to claim 3, wherein the top and side portions of the bearings include web regions between the longitudinal ribs, and the web regions of the top which are thinner than the web regions of the side portions, so that the top will bend easier than the side portions.

5. A reciprocating floor conveyor according to claim 4, wherein the bottom lock flanges comprise diagonal wall portions which extend both downwardly and inwardly from the side portions of the bearing, starting generally where the wings are attached to the side portions of the bearing.

6. A reciprocating floor conveyor according to claim 1, wherein the upper surfaces of the wings are positioned to be contacted by and provide bearing surfaces for the bottom flanges of the floor members.

7. A reciprocating floor conveyor, comprising:
a plurality of elongated floor members, each of which is of channel form comprising a top panel, a pair of opposite side panels projecting downwardly from the top panel, and a pair of bottom flanges projecting inwardly from the side panels;
an elongated metal guide beam for each floor member;
a plurality of transverse metal support beams;
said guide beams resting on and being welded to said metal support beams, by fillet welds disposed between the sides of the guide beams and the tops of support beams;
a plurality of plastic slide bearings on the guide beams at locations where the guide beams are welded to a support beam;
drive means for moving the floor members in one direction along the guide beams and bearings, for advancing a load, and for retracting them in the opposite direction; and
the improvement comprising:
each said plastic slide bearing having a top which extends the full length of the bearing above the guide beam on which the bearing is mounted, a pair of longitudinally spaced apart sidewall portions on each side of the bearing, said sidewall portions extending downwardly from the top of the bearing, outwardly adjacent the sides of the guide beam, and bottom lock flanges projecting inwardly from said sidewall portions, below the guide beam;
a wing on each side of the bearing, each wing extending laterally outwardly from its side of the bearing, in coplanar parallelism with the other wing, and in spaced parallelism with top of the bearing;
said wings having lower surfaces resting on upper surface portions of the support beams, between the guide beams, and upper surfaces situated below the bottom flanges of the floor members;
each said wing serving to longitudinally connect together lower regions of the two sidewall portions of the bearing located on its side of the bearing;
each said bearing including a side opening on each of its sides, between the two sidewall portions;
each said side opening extending vertically upwardly from the upper surface of the wing on its side of the bearing a substantial distance sufficient to provide vertical space for a fillet weld of substantial size;
each said wing including an inner edge which is spaced laterally outwardly from the adjacent side of its guide beam, at a distance substantially larger than the thickness of a sidewall portion of the bearing and sufficient to provide horizontal space for said fillet weld of substantial size; and
each said wing having an outer edge which makes mutually bracing contact with the outer edge of an adjacent wing on a laterally adjacent plastic slide bearing, for an adjoining floor member.

8. A reciprocating floor conveyor according to claim 7, wherein the side portions of the guide bearings include laterally outwardly projecting shoulder portions which together with the wings define longitudinal slots on the sides of the slide bearings sized to loosely receive inner edge portions of the bottom flanges of the floor members.

9. A reciprocating floor conveyor according to claim 8, wherein each slide bearing includes internal longitudinal ribs directed towards the guide beam, on each of the top, the side portions and the bottom lock flanges of the bearing, for strengthening the top, the side portions and the bottom lock flanges of the bearing.

10. A reciprocating floor conveyor according to claim 9, wherein the top and side portions of the bearings include web regions between the longitudinal ribs, and the web regions of the top which are thinner than the web regions of the side portions, so that the top will bend easier than the side portions.

11. A reciprocating floor conveyor according to claim 10, wherein the bottom lock flanges comprise diagonal wall portions which extend both downwardly and inwardly from the side portions of the bearing, starting generally where the wings are attached to the side portions of the bearing.

12. A reciprocating floor conveyor according to claim 7, wherein the upper surfaces of the wings are positioned to be contacted by and provide bearing surfaces for the bottom flanges of the floor members.

* * * * *